United States Patent Office.

THE RUMFORD CHEMICAL WORKS, OF PROVIDENCE, RHODE ISLAND, ASSIGNEES BY MESNE ASSIGNMENTS OF EBEN NORTON HORSFORD.

*Letters Patent No.* 14,722, *dated April* 22, 1856; *reissue No.* 2,597, *dated May* 7, 1867.

IMPROVEMENT IN THE MANUFACTURE OF PHOSPHORIC ACID, AND PHOSPHATES FOR USE IN THE PREPARATION OF FOOD, AND FOR OTHER PURPOSES.

The Schedule referred to in these Letters Patent and making part of the same.

TO ALL WHOM IT MAY CONCERN:

Be it known that EBEN NORTON HORSFORD, of Cambridge, in the county of Middlesex, and State of Massachusetts, has invented a new and improved Preparation or Substance, being a substitute for pulverulent acid for use in manufactures of soda powders and other similar compounds, where an acid is required; and it is hereby declared that the following is a full and exact description thereof, and of the mode of its preparation.

Carefully washed and preferably burned bones, after being finely ground, are sifted, with continual stirring, into freshly diluted oil of vitriol in the following proportions: five hundred pounds of bone ash, four hundred pounds oil of vitriol, and one thousand pounds of water. The mass is stirred from time to time for three days, when, ordinarily, the action will be complete, and there will have resulted phosphoric acid, superphosphates, and sulphate of lime with a small proportion of salts of magnesia and soda. The pasty mass may be mixed with flour or starch, or any farinaceous substance, while moist, and permitted slowly to dry in the sun, or with aid of artificial heat not above 150° Fahrenheit, or it may be mixed with freshly burned gypsum, and then dried in the sun or by artificial heat, or it may be mixed with stearine or other fatty bodies and dried, or the mass may be leached, and the concentrated extract mixed with burned gypsum or stearine, and dried, all of which have been found to give desirable results; but the method which, on the whole, is to be preferred is the following:

The pasty mass is leached, and the extract concentrated to 25° Baumé, in an evaporating-pan of cast iron, lined with porcelain, or other proper vessel. Ten gallons of this liquor are heated up to boiling, and four pounds of perfectly white bone ashes added, and the boiling continued till the whole is reduced to a little less than half its original bulk, when the concentrated liquid mass, containing in solution the added bone ashes, becomes pasty. The hot mass is then transferred to a convenient vessel to cool over night. In the morning following add to this concentrated pasty mass seventy-six pounds of wheaten flour, which is to be mixed to a uniform paste. Then add sixteen pounds of potato starch, and most carefully mix again, after which it should turn out friable or in a state of division, such that it may be passed through a sieve with quarter-inch meshes. If not sufficiently dry, it may be spread out a short time in the sun, or in a room heated to 120° Fahrenheit. The sifted mass should then be brought to a drying-chamber and spread out in trays until it becomes brittle, at a temperature of from 115° to 120° Fahrenheit, when the heat may be raised to from 130° to 150° Fahrenheit, and continued till the mass is thoroughly dried. When dried, the preparation should be packed in close boxes or barrels, to prevent the absorption of moisture.

The proportions of the agents employed may be varied somewhat without essentially affecting the result. Corn starch and other farinaceous substances, as rice, flour, or farina, may be substituted for wheaten flour and potato starch. Bone-black may be used instead of burned bones. The object is to obtain available phosphoric acid in such form that it may be intimately mixed with dry alkaline carbonates or other sensitive chemical compounds, without decomposing them or entering into combination with them, except upon the addition of moisture or the application of artificial heat. This requires that the acid or acid phosphates be mixed with a neutral diluting agent, as flour or starch, to increase the extent of surface, that the action may be prompt when moisture or heat is applied, and at the same time to more or less invest the particles of acid to prevent them from action or contact while dry. Prepared as above described the article is white or greyish white, coarse grained, may be readily pulverized, and, with water, may be stirred to an emulsion. It is exceedingly sour to the taste, but does not act when mixed with dry alkaline carbonates, without the addition of water or the application of heat. As a dry, brittle powder, the article has the advantages of a pulverulent acid, may be handled, weighed, stirred, &c., as tartaric acid or cream tartar, and, as a substitute for these, and a variety of similar pulverulent acids and acid salts, has many uses in manufactures. It may, among other uses, be mixed with dry alkaline carbonates, (carbonate of potassa or carbonate of soda,) and remain in this state without evolution of carbonic acid until moistened or heated; thus making it a substitute for cream tartar and tartaric acid in the proportion of yeast powder or baking powder.

The acidified mixture, prepared in accordance with the foregoing specification, is called by the inventor "Pulverulent Phosphoric Acid." The acid agent which this preparation places in available condition is phosphoric acid, as tartaric acid is the available acid agent in cream tartar, and this is used as a substitute for tartaric acid or cream tartar to decompose alkaline carbonates in the well-known process of making bread, cake, &c., without the use of ferment or leaven. It may be well to add that the substance produced and used in substantial accordance with this invention, yields phosphates of lime and the alkalies, which are important constituents of human food, and which are in great degree removed from the flour in the process of bolting; and thus the nutritious qualities of which it has been deprived are restored to the flour, and in general terms the various forms of farinaceous food are enriched with phosphates at the same time and with the same agents that are provided for as a substitute for ferment or leaven.

What is claimed as the invention of the said E. N. Horsford, is—

1. The mixing, in the preparation of farinaceous food, with flour, of a powder or powders, such as described, consisting of ingredients of which phosphoric acid or acid phosphates and alkaline carbonates are the active agents, for the purpose of liberating carbonic acid, as described, when subjected to moisture or heat, or both.

2. The use of phosphoric acid or acid phosphates, when employed with alkaline carbonates, as a substitute for ferment or leaven in the preparation of farinaceous food.

In testimony whereof the said Company, by E. N. Horsford, its president, has affixed its signature before two subscribing witnesses.

RUMFORD CHEMICAL WORKS,
By E. N. HORSFORD, *President.*

Witnesses:
M. Bailey,
Chas. G. Page, Jr.